(12) United States Patent
Costanzo et al.

(10) Patent No.: US 11,757,345 B2
(45) Date of Patent: Sep. 12, 2023

(54) MOTOR CURRENT MEASUREMENT APPARATUS AND METHOD

(71) Applicant: STMicroelectronics (Shenzhen) R&D Co. Ltd., Shenzhen (CN)

(72) Inventors: Dino Costanzo, Catania (IT); Xiyu Xu, Shenzhen (CN); Chengpan Cai, Shenzhen (CN)

(73) Assignee: STMicroelectronics (Shenzhen) R&D Co. Ltd., Shenzhen (CN)

( * ) Notice: Subject to any disclaimer, the term of this patent is extended or adjusted under 35 U.S.C. 154(b) by 43 days.

(21) Appl. No.: 17/646,934

(22) Filed: Jan. 4, 2022

(65) Prior Publication Data
US 2023/0216394 A1    Jul. 6, 2023

(51) Int. Cl.
*H02M 7/44*    (2006.01)
*H02M 1/00*    (2006.01)
*H02M 7/493*    (2007.01)
*H02P 5/505*    (2016.01)
*H02P 5/685*    (2006.01)

(52) U.S. Cl.
CPC ......... *H02M 1/0009* (2021.05); *H02M 7/493* (2013.01); *H02P 5/505* (2016.02); *H02P 5/685* (2013.01)

(58) Field of Classification Search
CPC ..... H02M 1/0009; H02M 7/493; H02P 5/505; H02P 5/685
See application file for complete search history.

(56) References Cited

U.S. PATENT DOCUMENTS

| | | | |
|---|---|---|---|
| 5,705,909 A | 1/1998 | Rajashekara | |
| 8,134,327 B2* | 3/2012 | Forte | H02M 7/53871 318/599 |
| 8,964,432 B2* | 2/2015 | Tang | H02M 1/12 363/71 |
| 9,966,893 B2 | 5/2018 | Schock et al. | |
| 10,976,353 B2 | 4/2021 | Roberts et al. | |
| 2013/0154395 A1* | 6/2013 | Chiang | H02M 7/44 307/151 |
| 2018/0358915 A1 | 12/2018 | Ishizuka | |
| 2021/0172983 A1 | 6/2021 | Costanzo et al. | |

FOREIGN PATENT DOCUMENTS

CN    111277176 A    6/2020
EP    2120323 A1    11/2009

* cited by examiner

*Primary Examiner* — Muhammad S Islam
(74) *Attorney, Agent, or Firm* — Slater Matsil, LLP

(57) ABSTRACT

An apparatus includes a first inverter configured to drive a first motor having a plurality of phases, the first inverter comprising a plurality of inverter legs, each of which is coupled to a corresponding phase of the first motor, a second inverter configured to drive a second motor having a plurality of phases, the second inverter comprising a plurality of inverter legs, each of which is coupled to a corresponding phase of the second motor, and a first current sensor configured to sense currents flowing in the first inverter and the second inverter, wherein the first current sensor is shared by at least by two inverter legs.

20 Claims, 14 Drawing Sheets

MOTOR CURRENT MEASUREMENT APPARATUS AND METHOD

TECHNICAL FIELD

The present invention relates generally to a current measurement apparatus and method in a multi-inverter and multi-motor system.

BACKGROUND

An electric machine needs three-phase alternating current (AC) current to establish a first magnetic field in a stator of the AC motor. The first magnetic field rotates at a synchronous speed with the AC power applied to the windings of the stator. The first magnetic field induces electric currents in a rotor of the AC motor. The induced current establishes a second magnetic field in the rotor. The second magnetic field of the rotor reacts against the first magnetic field of the stator. The interaction between the first magnetic field and the second magnetic field generates a mechanical torque pulling the rotor into rotation.

In a three-phase AC motor system, an AC motor comprises three phase windings. The three phase windings may be configured in two different ways, namely a WYE configuration and a Delta configuration. In operation, power sources are available in the form of direct current (DC). A three-phase inverter may be employed to convert DC power into AC power.

The three-phase inverter comprises three inverter legs, each of which comprises two switches connected in series. A common node of the two switches of a first leg is connected to a first phase winding of the three-phase AC motor. A common node of the two switches of a second leg is connected to a second phase winding of the three-phase AC motor. A common node of the two switches of a third leg is connected to a third phase winding of the three-phase AC motor.

In operation, pulse-width modulation (PWM) signals are used for controlling the on/off of the switches of the three-phase inverter. In particular, the rotation of the three-phase AC motor is controlled by controlling the on/off of the switches of the three-phase inverter. The speed and torque of the three-phase AC motor can be adjusted by controlling the amplitude voltage and the frequency of three-phase output voltages generated by the three-phase inverter using the PWM signals.

To better control the operation of the three-phase AC motor, it is necessary to precisely measure the current flowing through each phase winding of the three-phase AC motor. The current flowing through each phase winding can be measured using a current sense resistor connected in series with the phase winding. The voltage drop across the resistor is used to determine the current flowing through the phase winding. The three-phase AC motor may require three current sense resistors for precisely measuring the currents flowing through the three windings.

In order to simplify the current measurements, at least one current sense resistor can be removed based on the fact that the sum of all three currents flowing through the three phases of the three-phase AC motor is equal to zero, and the current of the phase not having a current sense resistor can be calculated based on the currents of the two phases having a current sense resistor.

The current measurement techniques described above require at least two current sense devices (e.g., current sense resistors) in each three-phase AC motor. In a multi-inverter and multi-motor system (e.g., a dual-inverter and dual-motor system), a large number of current sense devices are used for achieving accurate current measurements. The large number of current sense devices may occupy extra space, increase circuit complexity and the overall cost of bill of materials, and cause unnecessary power losses. It is desirable to have a simple and cost effective current sense device and method to precisely measure the currents flowing through the multi-inverter and multi-motor system.

SUMMARY

In accordance with an embodiment, an apparatus comprises a first inverter configured to drive a first motor having a plurality of phases, the first inverter comprising a plurality of inverter legs, each of which is coupled to a corresponding phase of the first motor, a second inverter configured to drive a second motor having a plurality of phases, the second inverter comprising a plurality of inverter legs, each of which is coupled to a corresponding phase of the second motor, and a first current sensor configured to sense currents flowing in the first inverter and the second inverter, wherein the first current sensor is shared by at least by two inverter legs.

In accordance with another embodiment, a method comprises configuring a first inverter to drive a first motor, wherein the first inverter comprises a plurality of inverter legs, each of which is coupled to a corresponding phase of the first motor, configuring a second inverter to drive a second motor, wherein the second inverter comprises a plurality of inverter legs, each of which is coupled to a corresponding phase of the second motor, and connecting a first current sensor in series with at least two inverter legs, wherein the at least two inverter legs are from two different inverters.

In accordance with yet another embodiment, a system comprises a first inverter having a plurality of inverter legs, each of which comprises two switches connected in series, a first motor having a plurality of phases, each of which is configured to be driven by a corresponding inverter leg of the first inverter, a second inverter having a plurality of inverter legs, each of which comprises two switches connected in series, a second motor having a plurality of phases, each of which is configured to be driven by a corresponding inverter leg of the second inverter, and a current sense apparatus configured to sense currents flowing in the first inverter and the second inverter, wherein the current sense apparatus is shared by at least by two inverter legs.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

The present disclosure will be described with respect to preferred embodiments in a specific context, namely a current measurement apparatus and method in a multi-inverter and multi-motor system. The present disclosure may also be applied, however, to a variety of motor drive applications. For example, the method is applicable to permanent magnet synchronous motors (PMSMs) where the rotor field is generated by magnets. The method is also applicable to switched reluctance motors and synchronous reluctance motors that work on the principle of achieving a configuration of minimum energy and/or reluctance. Hereinafter, various embodiments will be explained in detail with reference to the accompanying drawings.

Figure 1:
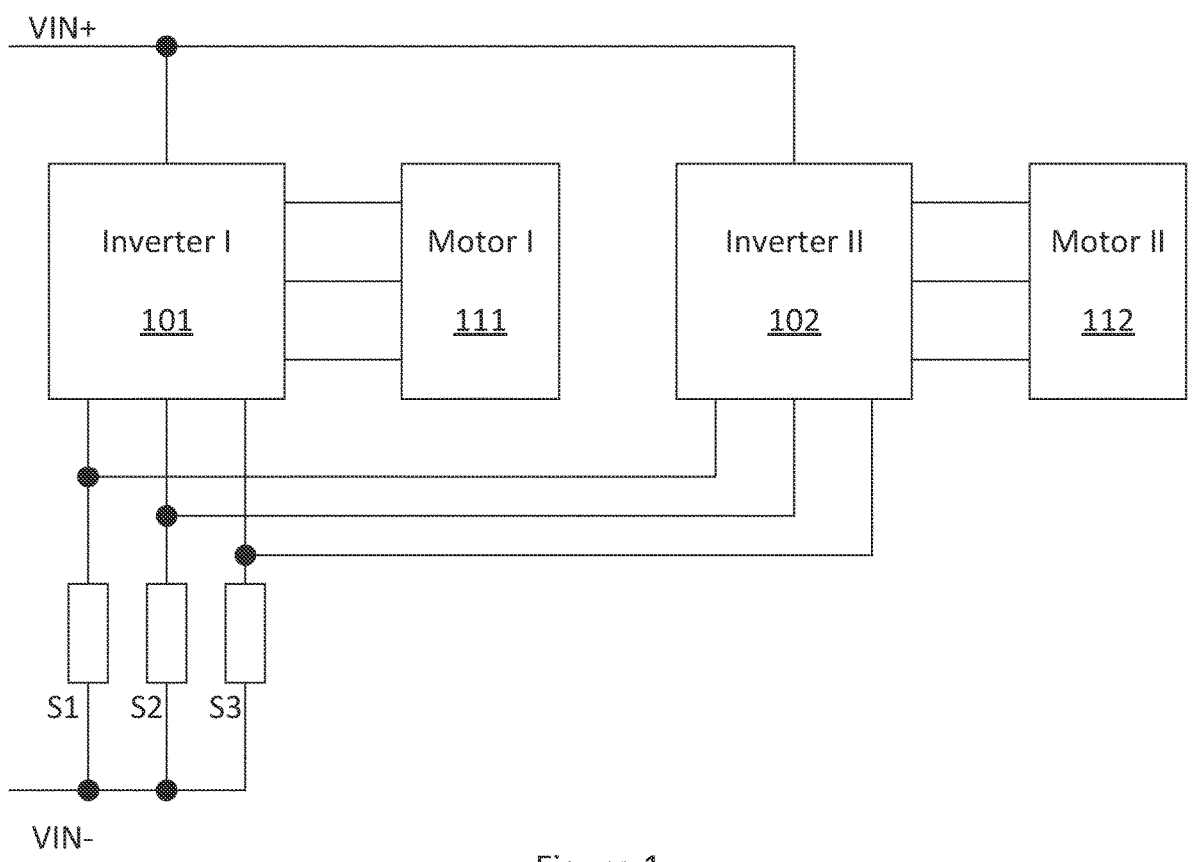
FIG. 1 illustrates a block diagram of a dual-motor system under a first current sense configuration in accordance with various embodiments of the present disclosure.

FIG. 1 illustrates a block diagram of a dual-motor system under a first current sense configuration in accordance with various embodiments of the present disclosure. The dual-motor system comprises a first motor 111, a first inverter 101, a second motor 112, a second inverter 102, a first current sensor S1, a second current sensor S2 and a third current sensor S3. As shown in FIG. 1, the first inverter 101 and the second inverter 102 are connected in parallel and further connected in series with the current sensors S1-S3 between a first voltage bus VIN+ and a second voltage bus VIN−. In some embodiments, the first voltage bus VIN+ may be coupled to an output of a DC power source. The second voltage bus VIN− may be coupled to ground.

The first motor 111 comprises a plurality of phases. The first inverter 101 comprises a plurality of inverter legs. Each of the plurality of inverter legs of the first inverter 101 is coupled to a corresponding phase of the first motor 111. The first inverter 101 is configured to drive the first motor 111. In some embodiments, the first motor 111 comprises three phases. The first motor 111 is a three-phase AC motor. The first inverter 101 comprises three inverter legs. Each of the three inverter legs of the first inverter 101 is coupled to a corresponding phase of the first motor 111. The detailed structures of the first motor 111 and the first inverter 101 will be described below with respect to FIG. 2.

The second motor 112 comprises a plurality of phases. The second inverter 102 comprises a plurality of inverter legs. Each of the plurality of inverter legs of the second inverter 102 is coupled to a corresponding phase of the second motor 112. The second inverter 102 is configured to drive the second motor 112. In some embodiments, the second motor 112 comprises three phases. The second motor 112 is a three-phase AC motor. The second inverter 102 comprises three inverter legs. Each of the three inverter legs of the second inverter 102 is coupled to a corresponding phase of the second motor 112. The detailed structures of the second motor 112 and the second inverter 102 will be described below with respect to FIG. 2.

As shown in FIG. 1, the first current sensor S1 is coupled to both the first inverter 101 and the second inverter 102. In particular, a first inverter leg of the first inverter 101 and a first inverter leg of the second inverter 102 are connected in parallel and further connected in series with the first current sensor S1. The first current sensor S1 is configured to sense the currents flowing through the first inverter leg of the first inverter 101 and the first inverter leg of the second inverter 102 in an alternating manner. The detailed operating principle of the first current sensor S1 will be described below with respect to FIG. 3.

As shown in FIG. 1, the second current sensor S2 is coupled to both the first inverter 101 and the second inverter 102. In particular, a second inverter leg of the first inverter 101 and a second inverter leg of the second inverter 102 are connected in parallel and further connected in series with the second current sensor S2. The second current sensor S2 is configured to sense the currents flowing through the second inverter leg of the first inverter 101 and the second inverter leg of the second inverter 102 in an alternating manner. The detailed operating principle of the second current sensor S2 will be described below with respect to FIG. 3.

As shown in FIG. 1, the third current sensor S3 is coupled to both the first inverter 101 and the second inverter 102. In particular, a third inverter leg of the first inverter 101 and a third inverter leg of the second inverter 102 are connected in parallel and further connected in series with the third current sensor S3. The third current sensor S3 is configured to sense the currents flowing through the third inverter leg of the first inverter 101 and the third inverter leg of the second inverter 102 in an alternating manner. The detailed operating principle of the third current sensor S3 will be described below with respect to FIG. 3.

In some embodiments, the current sensors (e.g., S1) shown in FIG. 1 may be implemented as a current sense resistor or a plurality of current sense resistors connected in parallel. In alternative embodiments, the current sensors (e.g., S1) shown in FIG. 1 may be implemented as an isolated current sensor such as a Hall Effect current sensor and the like.

In operation, a controller (not shown) may be used to process the detected currents of the dual-motor system. The controller may be implemented as a microcontroller unit (MCU), a digital signal processor (DSP) and the like. During the current measurement process, the controller can continuously decode separately all phase currents of the two motors through synchronizing the current sampling process and the applied PWM signals.

It should be noted that a plurality of associated circuits may be placed between the current sensors and the controller. The plurality of associated circuits comprises operational amplifiers, conditioning networks, filters and the like.

It should further be noted that FIG. 1 illustrates only two motors of a motor system that may include a plurality of such motors and the associated inverters. The number of motors illustrated in FIG. 1 is limited solely for the purpose of clearly illustrating the inventive aspects of the various embodiments. The present disclosure is not limited to any specific number of motors. For example, the current sense technique described throughout the specification may be applicable to a multiple motors (e.g., a triple-motor system) or a multiple generators (e.g., a triple-generator system). Furthermore, the current sense technique described throughout the specification may be applicable to multi-phase motors (e.g., six-phase motors).

It should further be noted that FIG. 1 illustrates the current sensors S1, S2 and S3 are placed below the inverters 101 and 102. A person skilled in the art would understand the arrangement of the current sensors shown in FIG. 1 is merely an example. One of ordinary skill in the art would recognize many variations, alternatives, and modifications. For example, the current sensors S1, S2 and S3 may be placed between the inverters and the first voltage bus VIN+.

Figure 2:
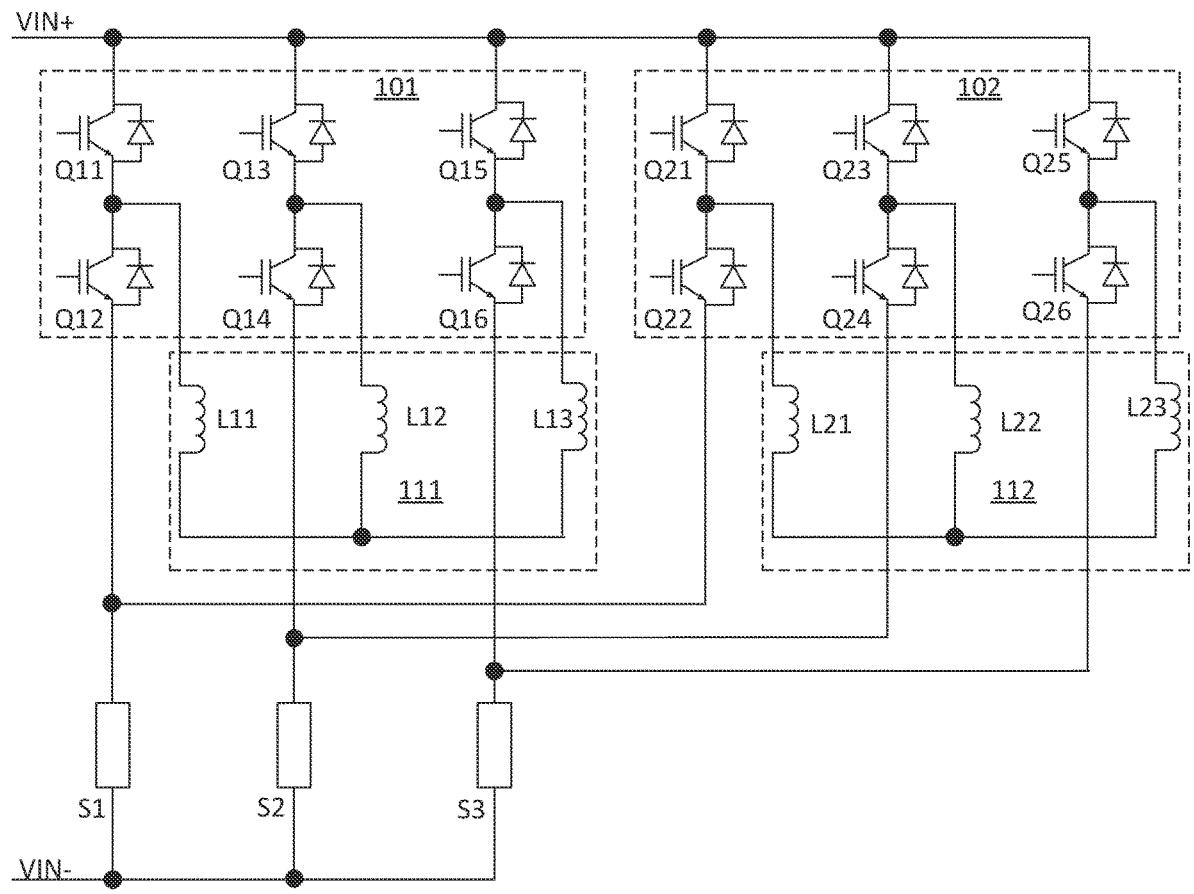
FIG. 2 illustrates a schematic diagram of the dual-motor system shown in FIG. 1 in accordance with various embodiments of the present disclosure.

FIG. 2 illustrates a schematic diagram of the dual-motor system shown in FIG. 1 in accordance with various embodiments of the present disclosure. As shown in FIG. 2, the first motor 111 comprises three windings L11, L12 and L13. In some embodiments, the three windings L11, L12 and L13 are connected in a wye configuration. As shown in FIG. 2, first ends of the three windings L11, L12 and L13 are connected together to form a neutral. Second ends of the three windings L11, L12 and L13 are connected to the inverter legs of the first inverter 101, respectively. The sum of the currents flowing into the neutral is approximately equal to zero. In some embodiments, the neutral may be grounded. Throughout the description, L11 may be alternatively referred to as a first phase of the first motor 111. Likewise, L12 and L13 may be alternatively referred to as a second phase and a third phase of the first motor 111, respectively.

As shown in FIG. 2, the second motor 112 comprises three windings L21, L22 and L23. In some embodiments, the three windings L21, L22 and L23 are connected in a wye configuration. As shown in FIG. 2, first ends of the three windings L21, L22 and L23 are connected together to form a neutral. Second ends of the three windings L21, L22 and L23 are connected to the inverter legs of the second inverter 102, respectively. The sum of the currents flowing into the neutral is approximately equal to zero. In some embodiments, the neutral may be grounded. Throughout the description, L21 may be alternatively referred to as a first phase of the second motor 112. Likewise, L22 and L23 may be alternatively referred to as a second phase and a third phase of the second motor 112, respectively.

The first leg of the first inverter 101 comprises two switches Q11 and Q12 connected in series. A common node of the two switches Q11 and Q12 is connected to the first phase L11 of the first motor 111. The second leg of the first inverter 101 comprises two switches Q13 and Q14 connected in series. A common node of the two switches Q13 and Q14 is connected to the second phase L12 of the first motor 111. The third leg of the first inverter 101 comprises two switches Q15 and Q16 connected in series. A common node of the two switches Q15 and Q16 is connected to the third phase L13 of the first motor 111.

The first leg of the second inverter 102 comprises two switches Q21 and Q22 connected in series. A common node of the two switches Q21 and Q22 is connected to the first phase L21 of the second motor 112. The second leg of the second inverter 102 comprises two switches Q23 and Q24 connected in series. A common node of the two switches Q23 and Q24 is connected to the second phase L22 of the second motor 112. The third leg of the second inverter 102 comprises two switches Q25 and Q26 connected in series. A common node of the two switches Q25 and Q26 is connected to the third phase L13 of the second motor 112.

In accordance with an embodiment, the switches of FIG. 2 may be insulated gate bipolar transistor (IGBT) devices. Alternatively, the switching element can be any controllable switches such as metal-oxide-semiconductor field-effect transistor (MOSFET) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices, silicon carbide (SiC) based power devices and the like.

As shown in FIG. 2, the first leg of the first inverter 101 and the first leg of the second inverter 102 are connected in parallel and further connected in series with the first current sensor S1. The second leg of the first inverter 101 and the second leg of the second inverter 102 are connected in parallel and further connected in series with the second current sensor S2. The third leg of the first inverter 101 and the third leg of the second inverter 102 are connected in parallel and further connected in series with the third current sensor S3. FIG. 2 shows each current sensor (e.g., S1) is shared by two inverter legs. These two inverter legs are from two different motors.

One advantageous feature of having the current sensors S1, S2 and S3 is that each current sensor is shared between the two motors. As a result, the cost and space occupied by the current sensors can be practically halved compared to the conventional current sensor configurations.

Figure 3:
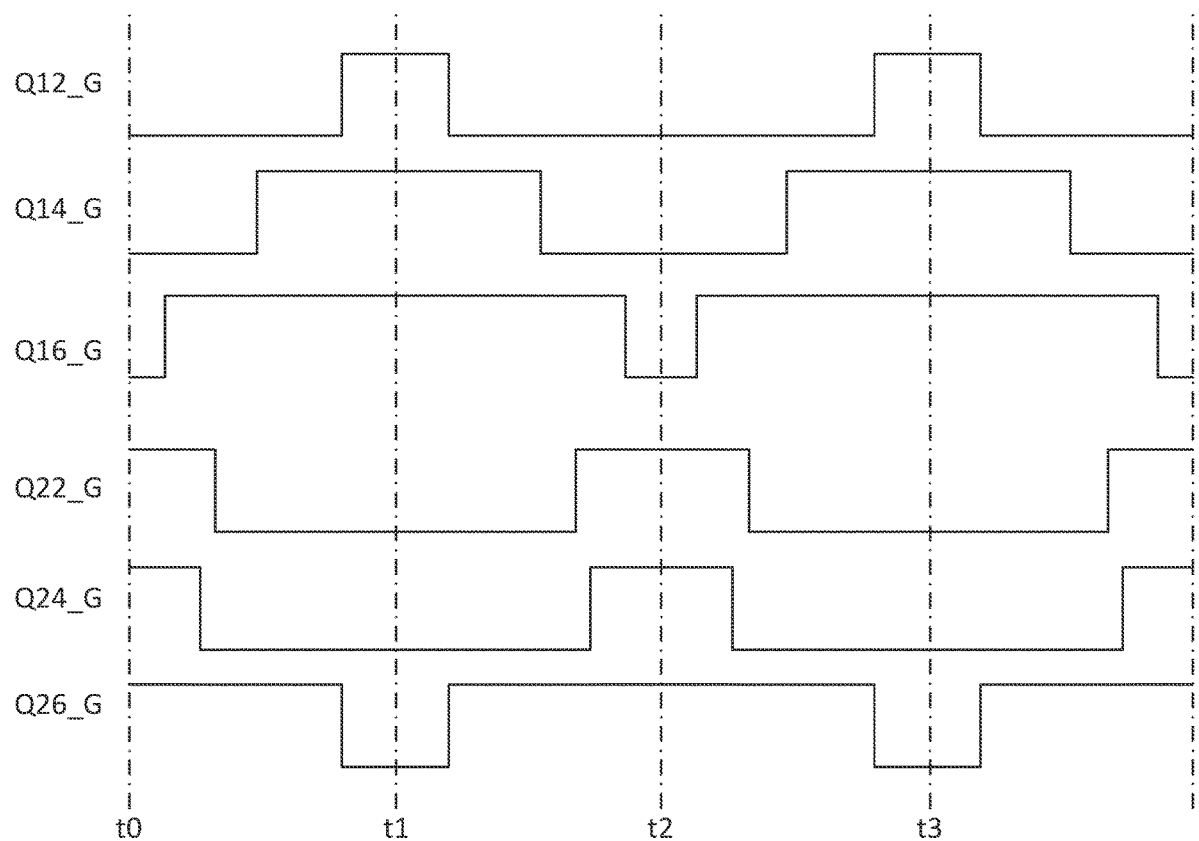
FIG. 3 illustrates a PWM pattern of the dual-motor system under the first current sense configuration in accordance with various embodiments of the present disclosure.

FIG. 3 illustrates a PWM pattern of the dual-motor system under the first current sense configuration in accordance with various embodiments of the present disclosure. There may be six rows in FIG. 3. The first row (Q12_G) represents the gate drive signal of switch Q12. The second row (Q14_G) represents the gate drive signal of switch Q14. The third row (Q16_G) represents the gate drive signal of switch Q16. The fourth row (Q22_G) represents the gate drive signal of switch Q22. The fifth row (Q24_G) represents the gate drive signal of switch Q24. The sixth row (Q26_G) represents the gate drive signal of switch Q26.

As shown in FIG. 3, one PWM period of the first motor 111 is from t0 to t2. The gate drive signals of Q12, Q14 and Q16 are symmetrical with reference to the dashed line at t1. One PWM period of the second motor 112 is from t1 to t3. The gate drive signals of Q22, Q24 and Q26 are symmetrical with reference to the dashed line at t2. As shown in FIG. 3, the drive signals of the first inverter 101 and the drive signals of the second inverter 102 are of a 180-degree phase shift. It should be noted the first current sense configuration and its associated current sense method are also applicable to the system where the drive signals of the first inverter and the drive signals of the second inverter are not of a 180-degree phase shift. Under this situation, the current sense accuracy can be achieved through employing suitable control algorithms such as dynamically changing the sampling time in each PWM period. By dynamically changing the sampling time in each PWM period, the sampling time of the first motor can be set at an instant on which the lower side switches of the first motor are turned on, and the upper side switches of the second motor are turned on. Likewise, the sampling time of the second motor can be set at an instant on which the lower side switches of the second motor are turned on, and the upper side switches of the first motor are turned on.

As shown in FIG. 3, at t1, as indicated by the gate drive signals Q12_G, Q14_G and Q16_G, switches Q12, Q14 and Q16 are turned on. The currents of the first motor 111 are recirculating in the lower side of the first inverter 101. In other words, at t1, the currents of the first motor 111 are flowing through switches Q12, Q14 and Q16 as well as the current sensors S1, S2 and S3 connected to the respective switches. At t1, as indicated by the gate drive signals Q22_G, Q24_G and Q26_G, switches Q22, Q24 and Q26 are turned off. The currents of the second motor 112 are recirculating in the upper side of the second inverter 102. In other words, at t1, the currents of the second motor 112 are not flowing through switches Q22, Q24 and Q26 and the current sensors S1, S2 and S3. As such, at t1, the current sensors S1, S2 and S3 are able to sample the currents of the first motor 111. Likewise, at t2, the currents of the second motor 112 are recirculating in the lower side of the second inverter 102. The currents of the first motor 111 are not flowing through switches Q12, Q14 and Q16 and the current sensors S1, S2 and S3. As such, at t2, the current sensors S1, S2 and S3 are able to sample the currents of the second motor 112.

In operation, the first current sensor S1 is configured to sense a current flowing through the first leg of the first inverter 101 at the first time instant t1. The current flowing through the first leg of the first inverter 101 is the current flowing through the first phase of the first motor 111. The first current sensor S1 is configured to sense a current flowing through the first leg of the second inverter 102 at the second time instant t2. The current flowing through the first leg of the second inverter 102 is the current flowing through the first phase of the second motor 112.

In operation, the second current sensor S2 is configured to sense a current flowing through the second leg of the first inverter 101 at the first time instant t1. The current flowing through the second leg of the first inverter 101 is the current flowing through the second phase of the first motor 111. The second current sensor S2 is configured to sense a current flowing through the second leg of the second inverter 102 at the second time instant t2. The current flowing through the second leg of the second inverter 102 is the current flowing through the second phase of the second motor 112.

In operation, the third current sensor S3 is configured to sense a current flowing through the third leg of the first inverter 101 at the first time instant t1. The current flowing through the third leg of the first inverter 101 is the current flowing through the third phase of the first motor 111. The third current sensor S3 is configured to sense a current flowing through the third leg of the second inverter 102 at the second time instant t2. The current flowing through the third leg of the second inverter 102 is the current flowing through the third phase of the second motor 112.

Figure 4:
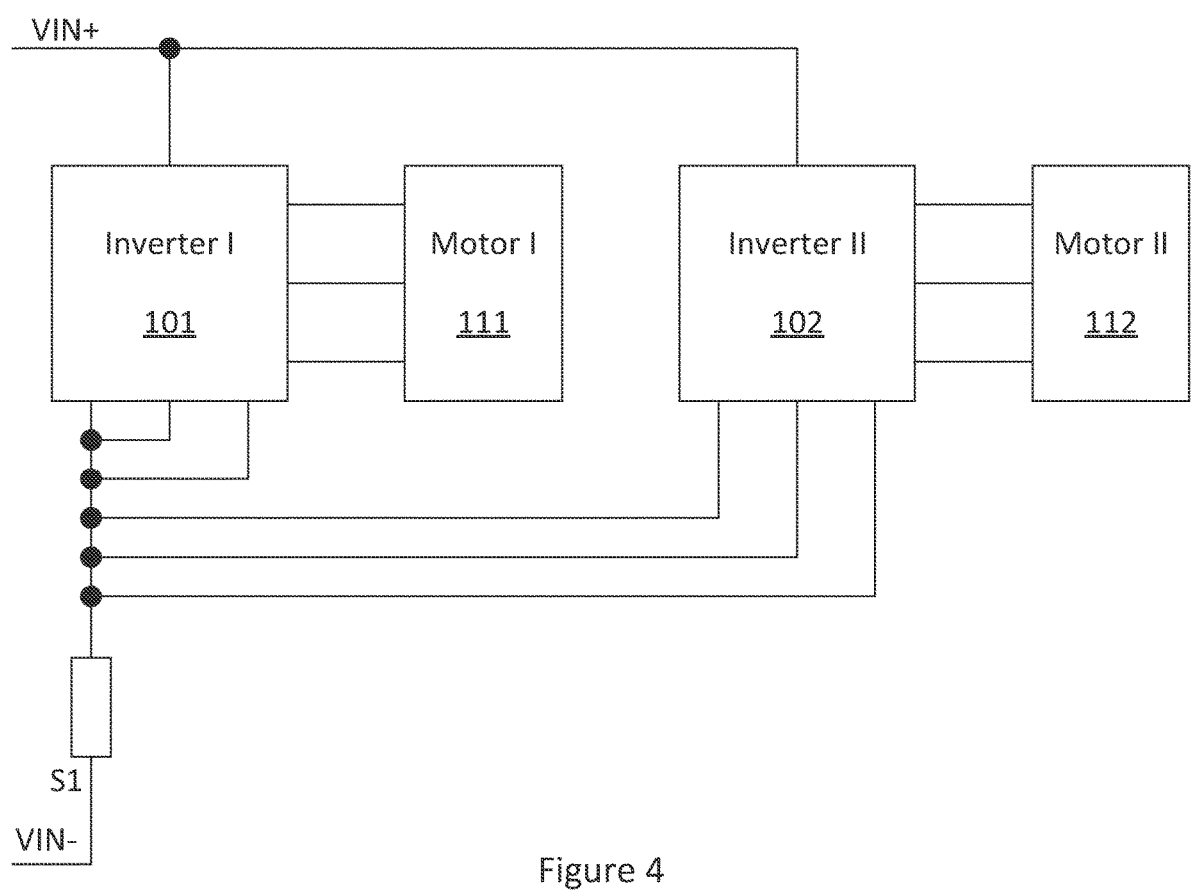
FIG. 4 illustrates a block diagram of a dual-motor system under a second current sense configuration in accordance with various embodiments of the present disclosure.

FIG. 4 illustrates a block diagram of a dual-motor system under a second current sense configuration in accordance with various embodiments of the present disclosure. The dual-motor system shown in FIG. 4 is similar to the dual-motor system shown in FIG. 1 except that a single current sensor is shared by two motors. As shown in FIG. 4, the first inverter 101 is connected between VIN+ and a first current sensor S1. Likewise, the second inverter 102 is connected between VIN+ and the first current sensor S1. S1 is configured to sample the phase currents of the two motors.

Figure 5:
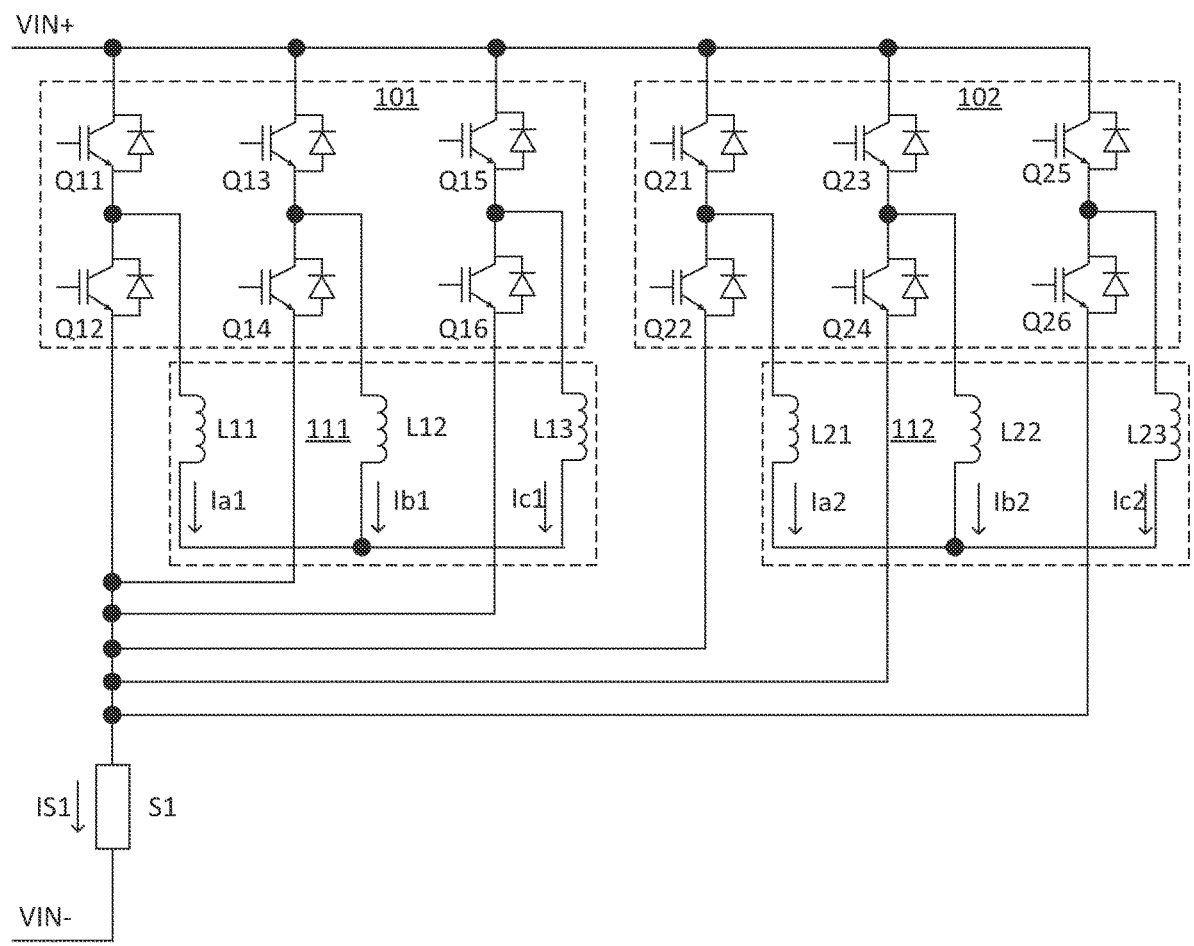
FIG. 5 illustrates a schematic diagram of the dual-motor system shown in FIG. 4 in accordance with various embodiments of the present disclosure.

FIG. 5 illustrates a schematic diagram of the dual-motor system shown in FIG. 4 in accordance with various embodiments of the present disclosure. The dual-motor system shown in FIG. 5 is similar to the dual-motor system shown in FIG. 2 except that the first leg, the second leg, the third leg of the first inverter, and the first leg, the second leg, the third leg of the second inverter are connected in parallel and further connected in series with the first current sensor S1.

Figure 6:
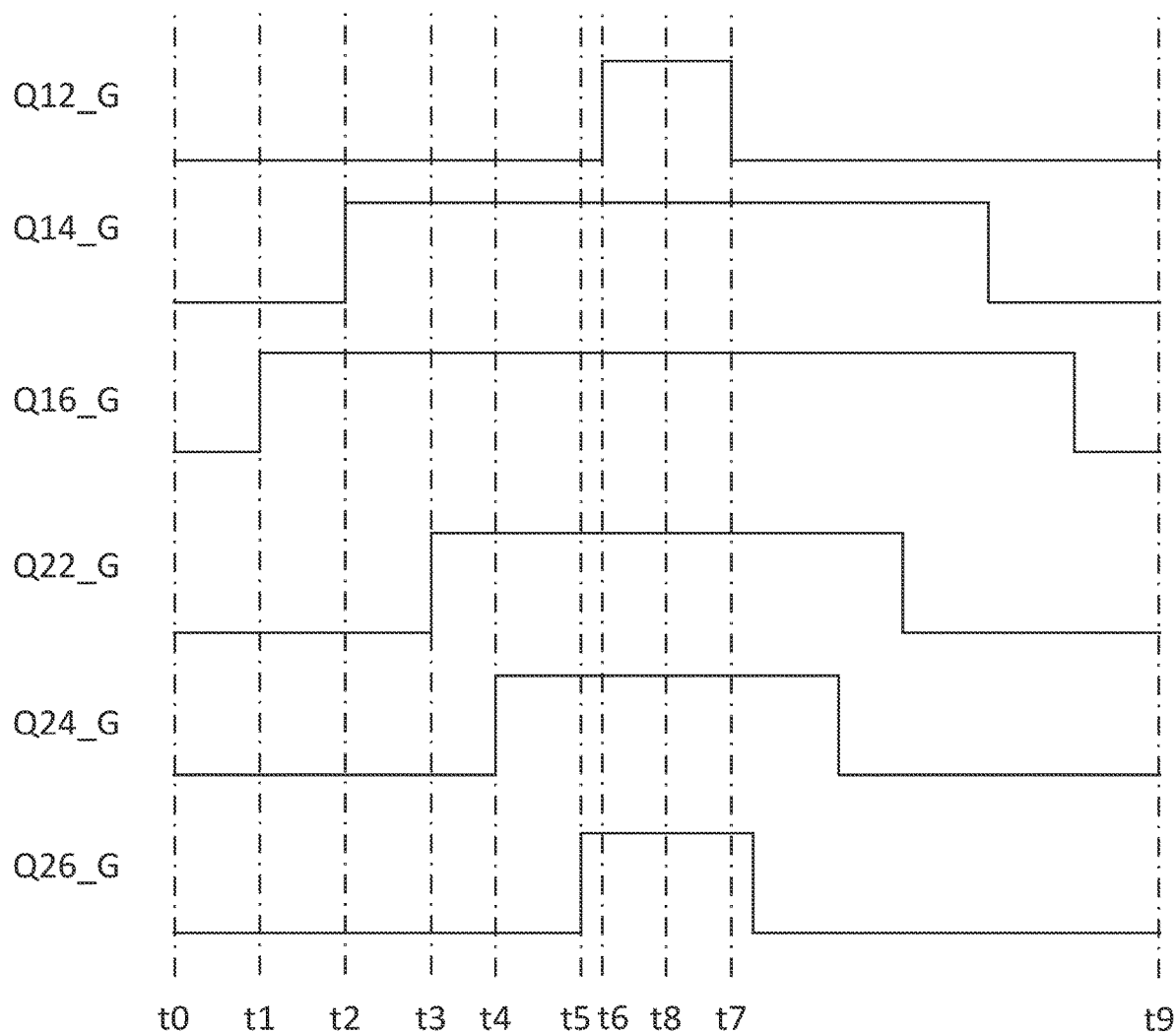
FIG. 6 illustrates a first PWM pattern of the dual-motor system under the second current sense configuration in accordance with various embodiments of the present disclosure.

FIG. 6 illustrates a first PWM pattern of the dual-motor system under the second current sense configuration in accordance with various embodiments of the present disclosure. There may be six rows in FIG. 6. The first row (Q12_G) represents the gate drive signal of switch Q12. The second row (Q14_G) represents the gate drive signal of switch Q14. The third row (Q16_G) represents the gate drive signal of switch Q16. The fourth row (Q22_G) represents the gate drive signal of switch Q22. The fifth row (Q24_G) represents the gate drive signal of switch Q24. The sixth row (Q26_G) represents the gate drive signal of switch Q26.

As shown in FIG. 6 one PWM period of the first motor 111 and the second motor 112 is from t0 to t9. At t8, a center of the drive signals of the first inverter 101 is aligned with a center of the drive signals of the second inverter 102. In other words, the drive signals of the first inverter 101 are in phase with the drive signals of the second inverter 102.

As shown in FIG. 6, the gate drive signals of the first inverter 101 and the second inverter 102 are symmetrical with reference to the dashed line at t8. The operating principle of the current sensor S1 in the second half of the period is similar to that in the first half. For simplicity, only the operating principle of the current sensor in the first half is discussed below in detail.

In operation, in a first current sample duration ranging from t0 to t1, the current flowing through the current sensor S1 is equal to zero. In a second current sample duration ranging from t1 to t2, the current (IS1) flowing through the current sensor S1 is equal to −Ic1. Based on the current flowing through the current sensor S1, a controller (not shown) is able to determine the current (Ic1) flowing through the third phase of the first motor 111.

In a third current sample duration ranging from t2 to t3, the current flowing through the current sensor S1 is equal to a sum of −Ib1 and −Ic1. Since the sum of Ia1, Ib1 and Ic1 is equal to zero, the controller is able to calculate the value of Ia1 accordingly. In other words, based on the current flowing through the current sensor S1, the controller is able to determine the current (Ia1) flowing through the first phase of the first motor 111.

In a fourth current sample duration ranging from t3 to t4, the current flowing through the current sensor S1 is equal to a sum of Ia1 and −Ia2. Since the value of Ia1 has been determined in the third current sample duration, the controller is able to calculate the value of Ia2 accordingly. In other words, based on the current flowing through the current sensor S1, the controller is able to determine the current (Ia2) flowing through the first phase of the second motor 112.

In a fifth current sample duration ranging from t4 to t5, the current flowing through the current sensor S1 is equal to a sum of Ia1 and Ic2. Since the value of Ia1 has been determined in the third current sample duration, the controller is able to calculate the value of Ic2 accordingly. In other words, based on the current flowing through the current sensor S1, the controller is able to determine the current (Ic2) flowing through the third phase of the second motor 112.

In a sixth current sample duration ranging from t5 to t6, the current flowing through the current sensor S1 is equal to a sum of −Ib1, −Ic1, −Ia2, −Ib2 and −Ic2. Since the sum of the phase currents in each motor is equal to zero, the controller is able to calculate the value of Ia1 accordingly. In other words, based on the current flowing through the current sensor S1, the controller is able to determine the current (Ia1) flowing through the first phase of the first motor 111.

It should be noted that both the third current sample duration and the sixth current sample duration are used to detect the current (Ia1) flowing through the first phase of the first motor 111. The controller may determine Ia1 based on the average of these two measured results.

In a seventh current sample duration ranging from t6 to t7, the current flowing through the current sensor S1 is equal to a sum of −Ia1, −Ib1, −Ic1, −Ia2, −Ib2 and −Ic2. Since the sum of the phase currents in each motor is equal to zero, the current flowing through the current sensor S1 is equal to zero.

Table 1 shows the direct and indirect current measurement results obtained through applying the current detection method described above to the first PWM pattern shown in FIG. 6.

TABLE 1

| Current Sample Duration | Motor Currents | Motor Current Detected Directly | Motor Current Detected Indirectly |
|---|---|---|---|
| 1st Sample Duration | 0 | | |
| 2nd Sample Duration | −Ic1 | Ic1 | |
| 3rd Sample Duration | Ia1 | Ia1 | |
| 4th Sample Duration | Ia1 − Ia2 | | Ia2 |
| 5th Sample Duration | Ia1 + Ic2 | | Ic2 |
| 6th Sample Duration | Ia1 | Ia1 | |
| 7th Sample Duration | 0 | | |

As shown in Table 1, at least one phase current (e.g., Ia2 or Ic2) is detected indirectly based on the directly measured phase currents. Furthermore, the controller is able to determine the value of the current (Ib1) flowing through the second phase of the first motor 111 because Ib1 is equal to the sum of −Ia1 and −Ic1. Likewise, the controller is able to determine the value of the current (Ib2) flowing through the second phase of the second motor 112 because Ib2 is equal to the sum of −Ia2 and −Ic2.

Figure 7:
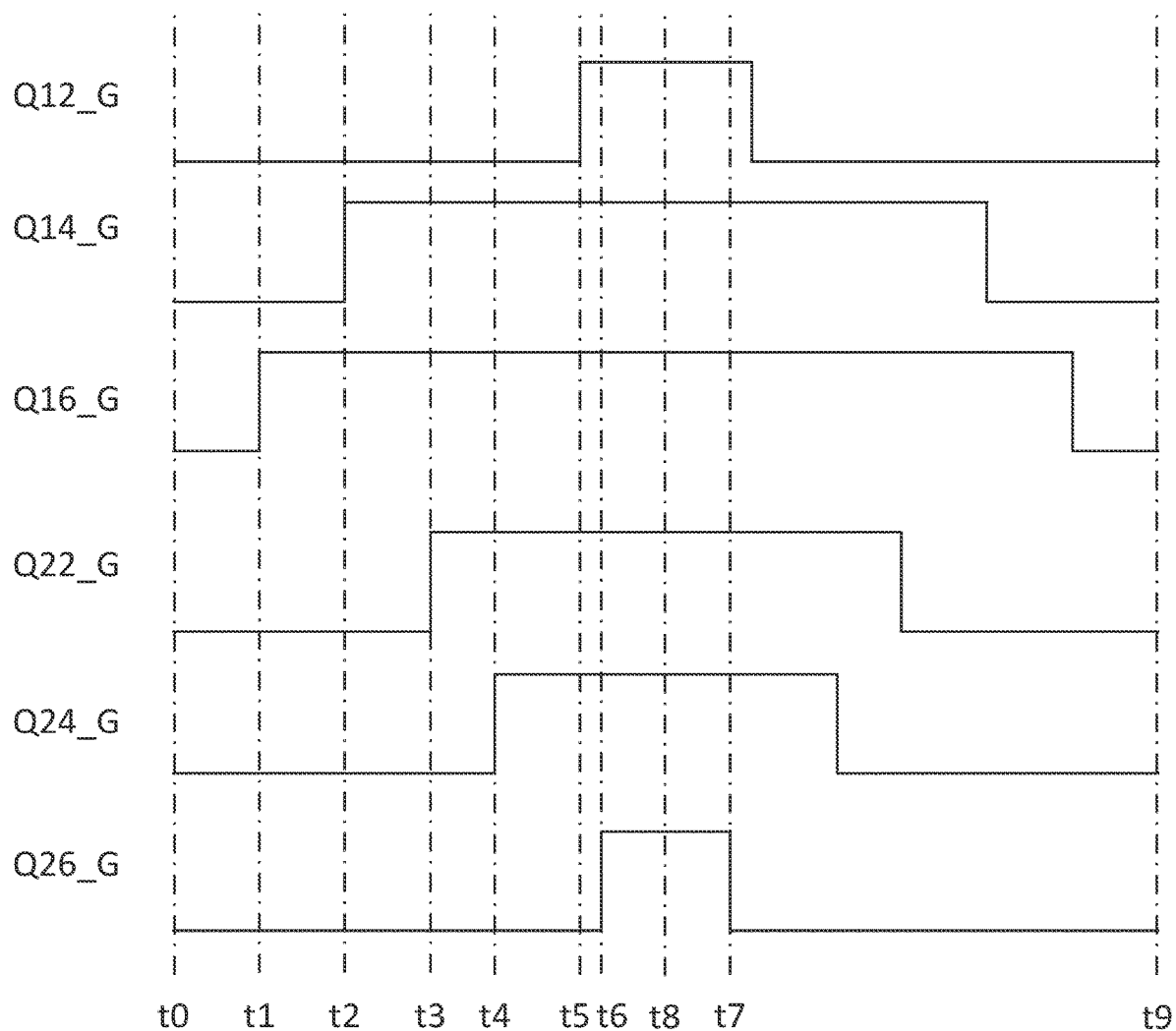
FIG. 7 illustrates a second PWM pattern of the dual-motor system under the second current sense configuration in accordance with various embodiments of the present disclosure.

FIG. 7 illustrates a second PWM pattern of the dual-motor system under the second current sense configuration in accordance with various embodiments of the present disclosure. The second PWM pattern shown in FIG. 7 is similar to the first PWM pattern shown in FIG. 6 except that the gate drive signal of Q12 and the gate drive signal of Q26 are swapped. The current detection method applied to the second PWM pattern is similar to that applied to the first PWM pattern described above with respect to FIG. 6, and hence is not discussed herein again to avoid repetition.

Table 2 shows the direct and indirect current measurement results obtained through applying the current detection method described above to the second PWM pattern shown in FIG. 7.

TABLE 2

| Current Sample Duration | Motor Currents | Motor Current Detected Directly | Motor Current Detected Indirectly |
|---|---|---|---|
| 1st Sample Duration | 0 | | |
| 2nd Sample Duration | −Ic1 | Ic1 | |
| 3rd Sample Duration | Ia1 | Ia1 | |
| 4th Sample Duration | Ia1 − Ia2 | | Ia2 |
| 5th Sample Duration | Ia1 + Ic2 | | Ic2 |
| 6th Sample Duration | Ic2 | Ic2 | |
| 7th Sample Duration | 0 | | |

As shown in Table 2, at least one phase current (e.g., Ia2) is detected indirectly based on directly measured phase currents. Furthermore, the controller is able to determine the value of Ib1 because Ib1 is equal to the sum of −Ia1 and −Ic1. Likewise, the controller is able to determine the value of Ib2 because Ib2 is equal to the sum of −Ia2 and −Ic2.

It should be noted that in the fifth current sample duration, Ic2 is detected indirectly. In the sixth current sample duration, Ic2 is detected directly. The controller may determine Ic2 based on the average of these two measured results.

Figure 8:
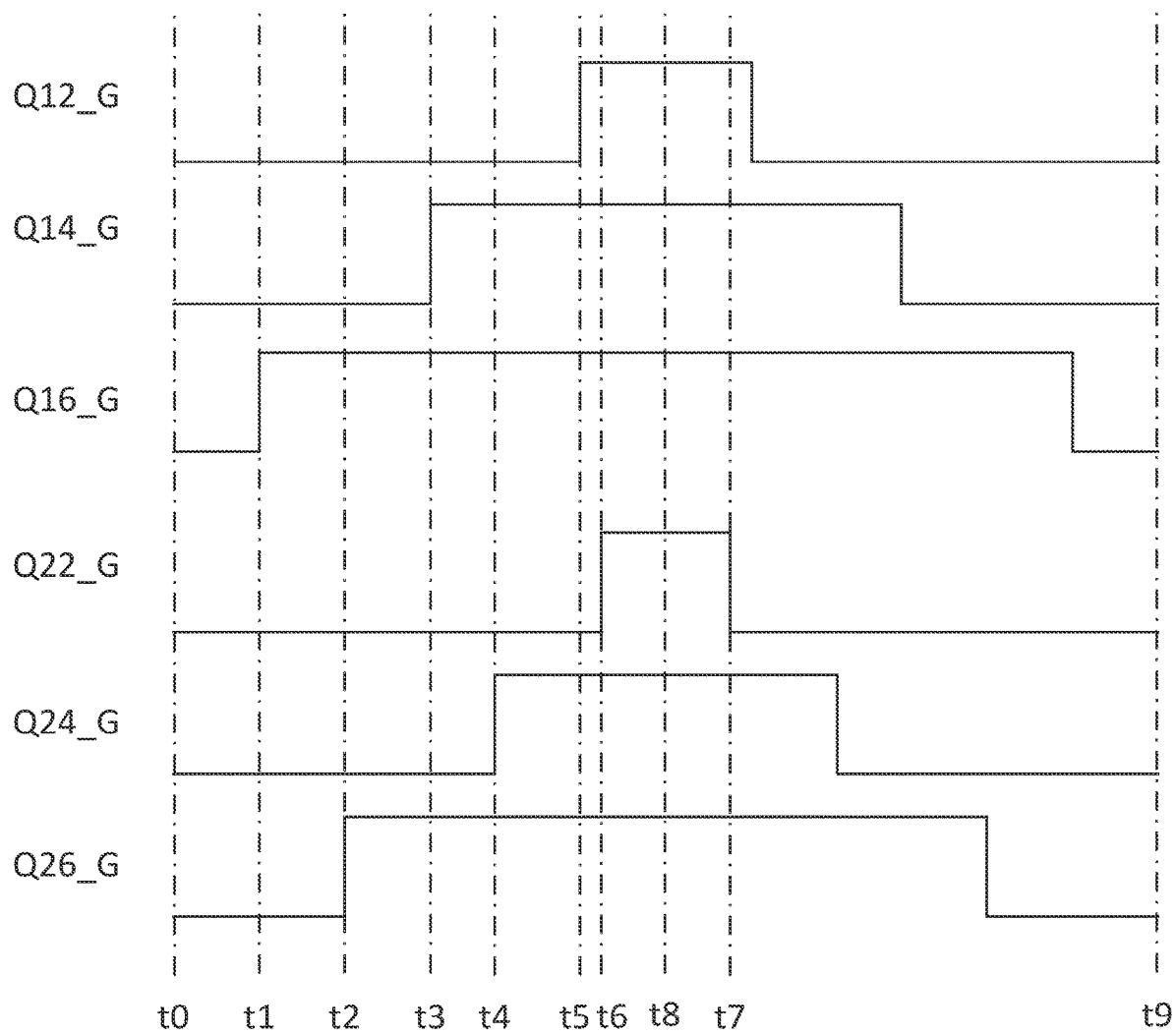
FIG. 8 illustrates a third PWM pattern of the dual-motor system under the second current sense configuration in accordance with various embodiments of the present disclosure.

FIG. 8 illustrates a third PWM pattern of the dual-motor system under the second current sense configuration in accordance with various embodiments of the present disclosure. The third PWM pattern shown in FIG. 8 is similar to the second PWM pattern shown in FIG. 7 except that the gate drive signal of Q22 and the gate drive signal of Q26 are swapped. The current detection method applied to the third PWM pattern is similar to that applied to the first PWM pattern described above with respect to FIG. 6, and hence is not discussed herein again to avoid repetition.

Table 3 shows the direct and indirect current measurement results obtained through applying the current detection method described above to the third PWM pattern shown in FIG. 8.

TABLE 3

| Current Sample Duration | Motor Currents | Motor Current Detected Directly | Motor Current Detected Indirectly |
|---|---|---|---|
| 1st Sample Duration | 0 | | |
| 2nd Sample Duration | −Ic1 | Ic1 | |
| 3rd Sample Duration | −Ic1 − Ic2 | | Ic2 |
| 4th Sample Duration | Ia1 − Ic2 | | Ia1 |
| 5th Sample Duration | Ia1 + Ia2 | | Ia2 |
| 6th Sample Duration | Ia2 | Ia2 | |
| 7th Sample Duration | 0 | | |

As shown in Table 3, at least one phase current (e.g., Ia1) is detected indirectly based on directly measured phase currents. Furthermore, the controller is able to determine the value of Ib1 because Ib1 is equal to the sum of −Ia1 and −Ic1. Likewise, the controller is able to determine the value of Ib2 because Ib2 is equal to the sum of −Ia2 and −Ic2.

It should be noted that in the fifth current sample duration, Ia2 is detected indirectly. In the sixth current sample duration, Ia2 is detected directly. The controller may determine Ia2 based on the average of these two measured results.

Figure 9:
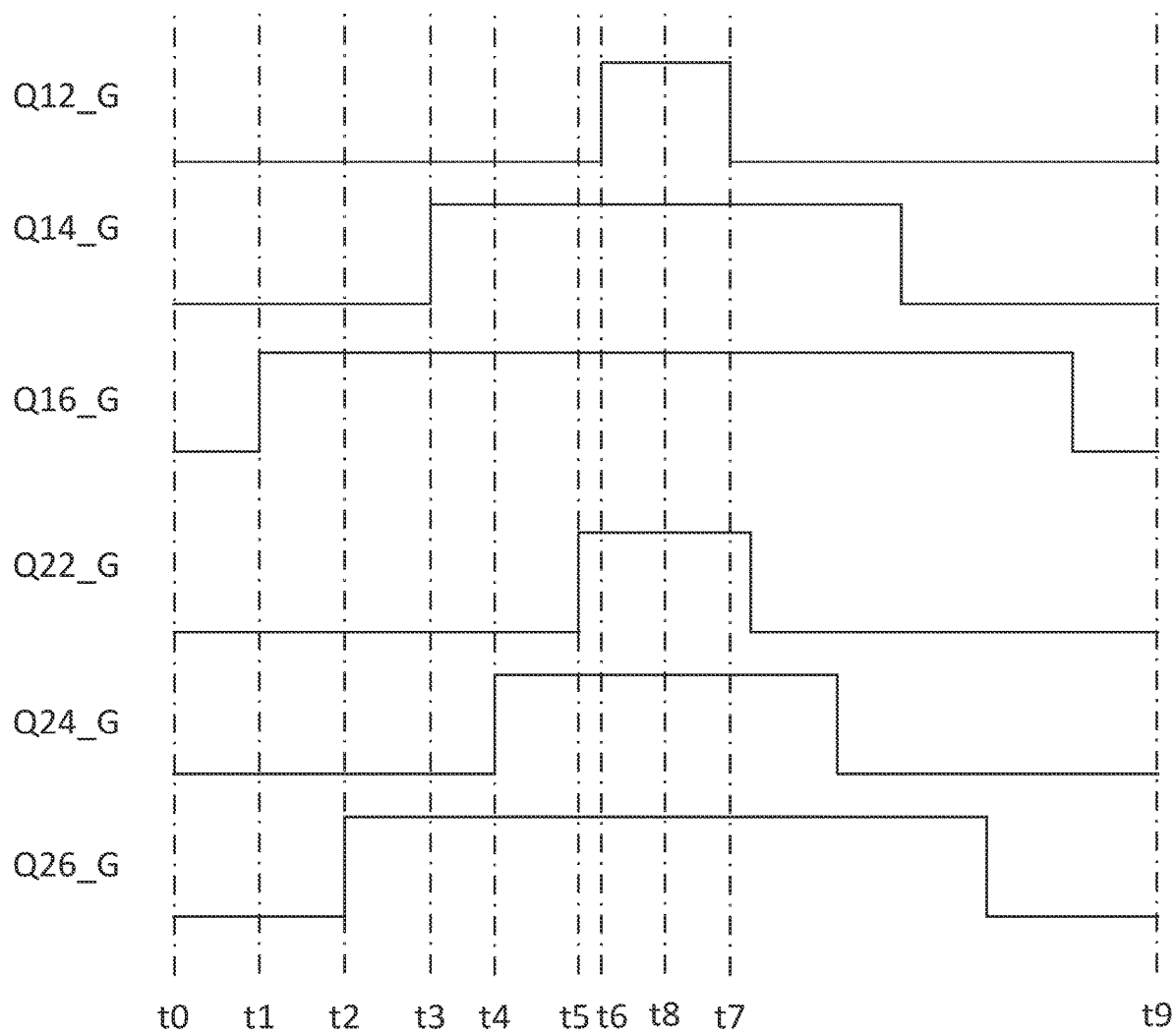
FIG. 9 illustrates a fourth PWM pattern of the dual-motor system under the second current sense configuration in accordance with various embodiments of the present disclosure.

FIG. 9 illustrates a fourth PWM pattern of the dual-motor system under the second current sense configuration in accordance with various embodiments of the present disclosure. The fourth PWM pattern shown in FIG. 9 is similar to the third PWM pattern shown in FIG. 8 except that the gate drive signal of Q12 and the gate drive signal of Q22 are swapped. The current detection method applied to the fourth PWM pattern is similar to that applied to the first PWM pattern described above with respect to FIG. 6, and hence is not discussed herein again to avoid repetition.

Table 4 shows the direct and indirect current measurement results obtained through applying the current detection method described above to the fourth PWM pattern shown in FIG. 9.

TABLE 4

| Current Sample Duration | Motor Currents | Motor Current Detected Directly | Motor Current Detected Indirectly |
|---|---|---|---|
| 1st Sample Duration | 0 | | |
| 2nd Sample Duration | −Ic1 | Ic1 | |
| 3rd Sample Duration | −Ic1 − Ic2 | | Ic2 |
| 4th Sample Duration | Ia1 − Ic2 | | Ia1 |
| 5th Sample Duration | Ia1 + Ia2 | | Ia2 |
| 6th Sample Duration | Ia1 | Ia1 | |
| 7th Sample Duration | 0 | | |

As shown in Table 4, at least one phase current (e.g., Ic2) is detected indirectly based on directly measured phase currents. Furthermore, the controller is able to determine the value of Ib1 because Ib1 is equal to the sum of −Ia1 and −Ic1. Likewise, the controller is able to determine the value of Ib2 because Ib2 is equal to the sum of −Ia2 and −Ic2.

It should be noted that in the fourth current sample duration, Ia1 is detected indirectly. In the sixth current sample duration, Ia1 is detected directly. The controller may determine Ia1 based on the average of these two measured results.

Figure 10:
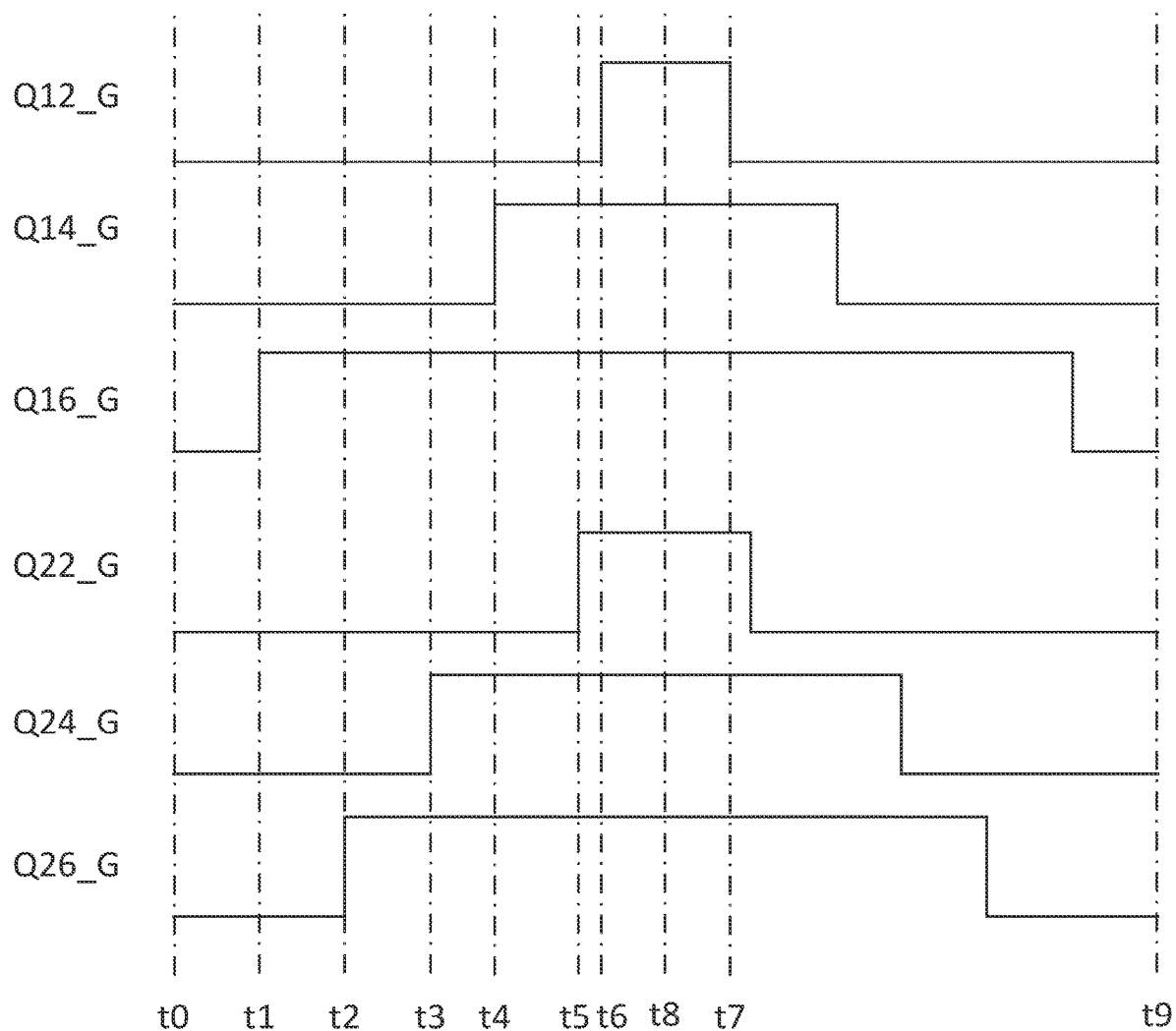
FIG. 10 illustrates a fifth PWM pattern of the dual-motor system under the second current sense configuration in accordance with various embodiments of the present disclosure.

FIG. 10 illustrates a fifth PWM pattern of the dual-motor system under the second current sense configuration in accordance with various embodiments of the present disclosure. The fifth PWM pattern shown in FIG. 10 is similar to the fourth PWM pattern shown in FIG. 9 except that the gate drive signal of Q14 and the gate drive signal of Q24 are swapped. The current detection method applied to the fifth PWM pattern is similar to that applied to the first PWM pattern described above with respect to FIG. 6, and hence is not discussed herein again to avoid repetition.

Table 5 shows the direct and indirect current measurement results obtained through applying the current detection method described above to the fifth PWM pattern shown in FIG. 10.

TABLE 5

| Current Sample Duration | Motor Currents | Motor Current Detected Directly | Motor Current Detected Indirectly |
|---|---|---|---|
| 1st Sample Duration | 0 | | |
| 2nd Sample Duration | −Ic1 | Ic1 | |
| 3rd Sample Duration | −Ic1 − Ic2 | | Ic2 |
| 4th Sample Duration | Ia2 − Ic1 | | Ia2 |
| 5th Sample Duration | Ia1 + Ia2 | | Ia1 |
| 6th Sample Duration | Ia1 | Ia1 | |
| 7th Sample Duration | 0 | | |

As shown in Table 5, at least one phase current (e.g., Ic2) is detected indirectly based on directly measured phase currents. Furthermore, the controller is able to determine the value of Ib1 because Ib1 is equal to the sum of −Ia1 and −Ic1. Likewise, the controller is able to determine the value of Ib2 because Ib2 is equal to the sum of −Ia2 and −Ic2.

It should be noted that in the fifth current sample duration, Ia1 is detected indirectly. In the sixth current sample duration, Ia1 is detected directly. The controller may determine Ia1 based on the average of these two measured results.

Figure 11:
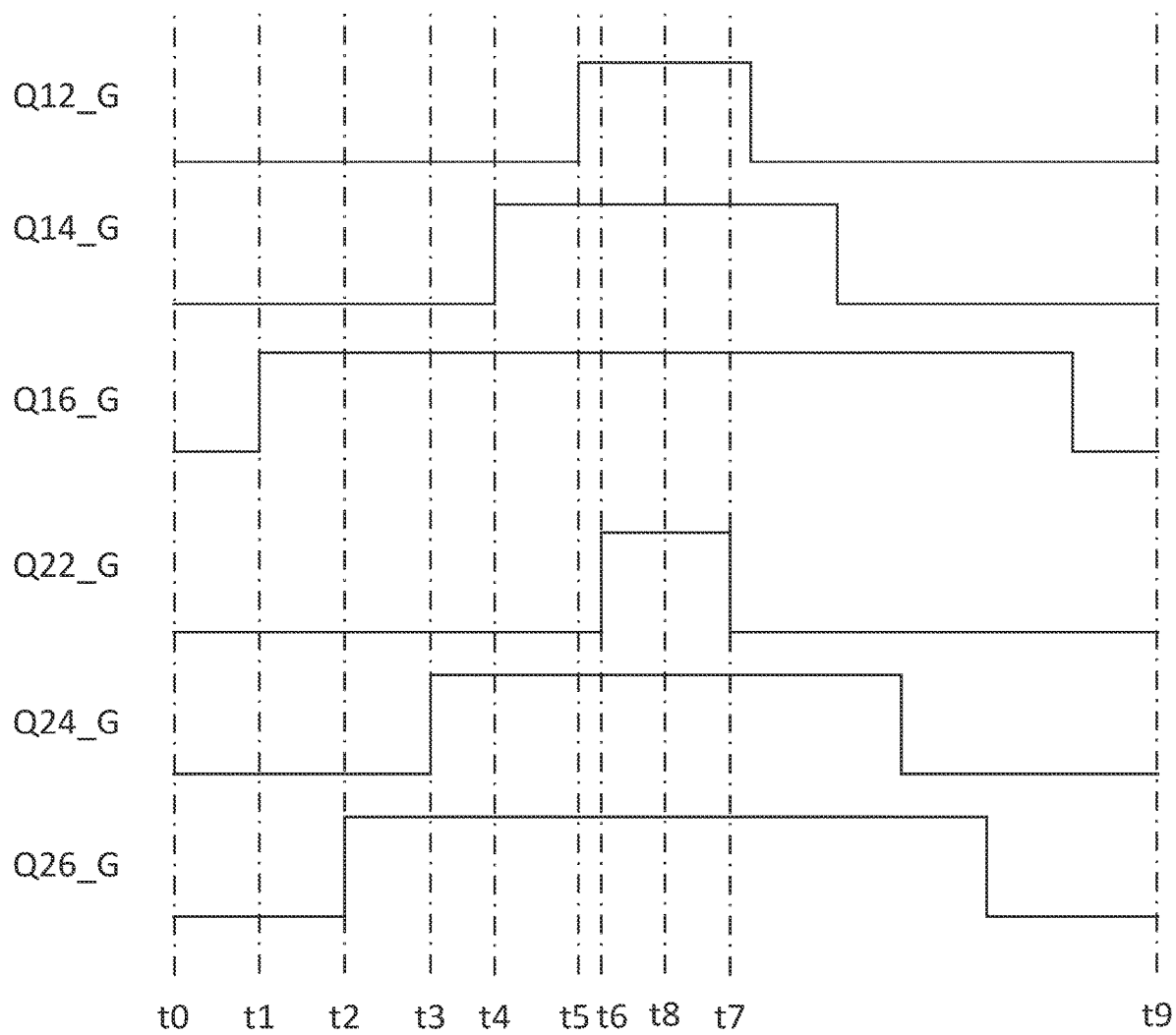
FIG. 11 illustrates a sixth PWM pattern of the dual-motor system under the second current sense configuration in accordance with various embodiments of the present disclosure.

FIG. 11 illustrates a sixth PWM pattern of the dual-motor system under the second current sense configuration in accordance with various embodiments of the present disclosure. The sixth PWM pattern shown in FIG. 11 is similar to the fifth PWM pattern shown in FIG. 10 except that the gate drive signal of Q12 and the gate drive signal of Q22 are swapped. The current detection method applied to the sixth PWM pattern is similar to that applied to the first PWM pattern described above with respect to FIG. 6, and hence is not discussed herein again to avoid repetition.

Table 6 shows the direct and indirect current measurement results obtained through applying the current detection method described above to the sixth PWM pattern shown in FIG. 11.

TABLE 6

| Current Sample Duration | Motor Currents | Motor Current Detected Directly | Motor Current Detected Indirectly |
|---|---|---|---|
| 1st Sample Duration | 0 | | |
| 2nd Sample Duration | −Ic1 | Ic1 | |
| 3rd Sample Duration | −Ic1 − Ic2 | | Ic2 |
| 4th Sample Duration | Ia2 − Ic1 | | Ia2 |
| 5th Sample Duration | Ia1 + Ia2 | | Ia1 |
| 6th Sample Duration | Ia2 | Ia2 | |
| 7th Sample Duration | 0 | | |

As shown in Table 6, at least one phase current (e.g., Ic2) is detected indirectly based on directly measured phase currents. Furthermore, the controller is able to determine the value of Ib1 because Ib1 is equal to the sum of −Ia1 and −Ic1. Likewise, the controller is able to determine the value of Ib2 because Ib2 is equal to the sum of −Ia2 and −Ic2.

It should be noted that in the fourth current sample duration, Ia2 is detected indirectly. In the sixth current sample duration, Ia2 is detected directly. The controller may determine Ia2 based on the average of these two measured results.

Figure 12:
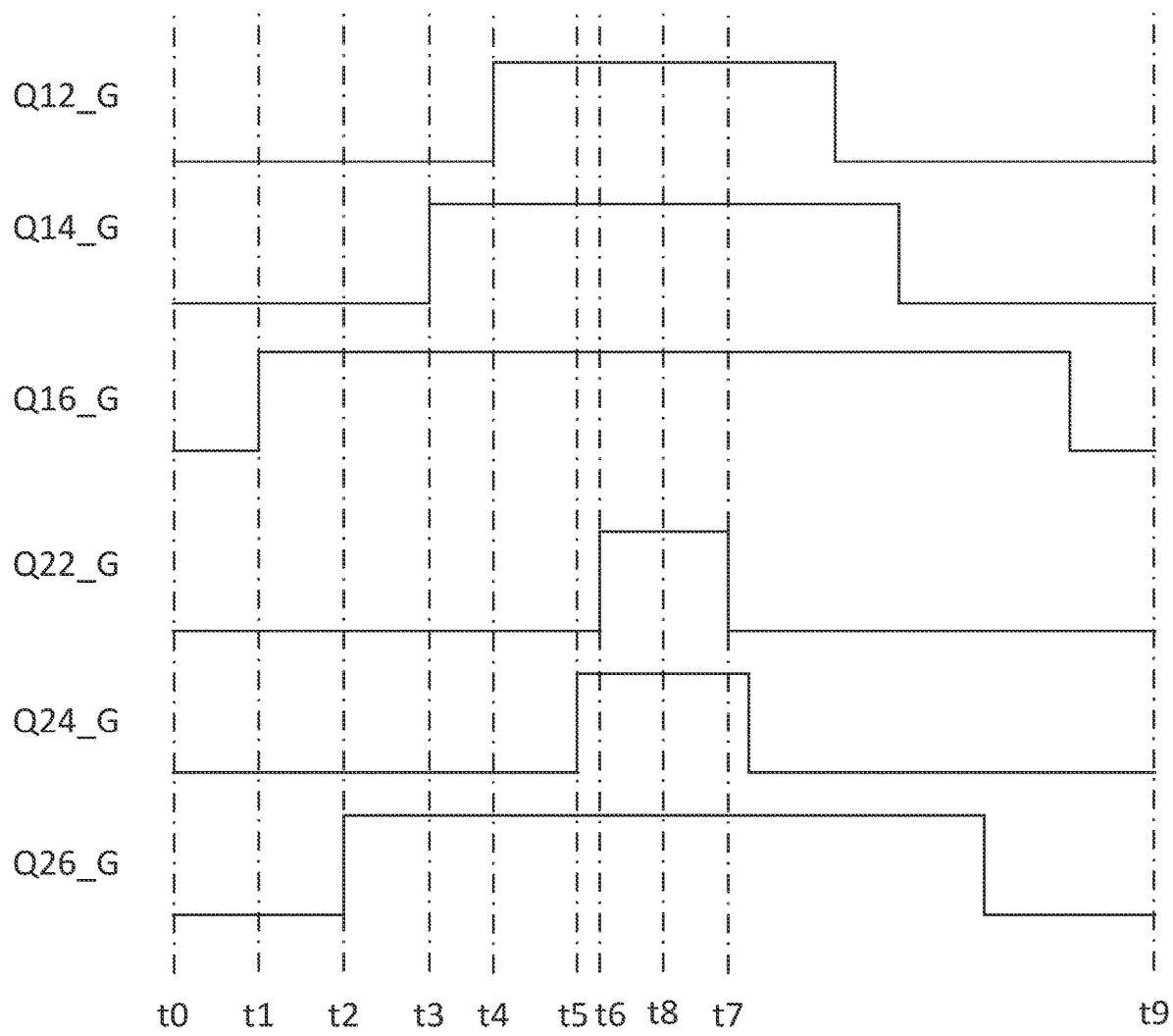
FIG. 12 illustrates a seventh PWM pattern of the dual-motor system under the second current sense configuration in accordance with various embodiments of the present disclosure.

FIG. 12 illustrates a seventh PWM pattern of the dual-motor system under the second current sense configuration in accordance with various embodiments of the present disclosure. The seventh PWM pattern shown in FIG. 12 is similar to the third PWM pattern shown in FIG. 8 except that the gate drive signal of Q12 and the gate drive signal of Q24 are swapped. The current detection method applied to the seventh PWM pattern is similar to that applied to the first PWM pattern described above with respect to FIG. 6, and hence is not discussed herein again to avoid repetition.

Table 7 shows the direct and indirect current measurement results obtained through applying the current detection method described above to the seventh PWM pattern shown in FIG. 12.

TABLE 7

| Current Sample Duration | Motor Currents | Motor Current Detected Directly | Motor Current Detected Indirectly |
|---|---|---|---|
| 1st Sample Duration | 0 | | |
| 2nd Sample Duration | −Ic1 | Ic1 | |
| 3rd Sample Duration | −Ic1 − Ic2 | | Ic2 |
| 4th Sample Duration | Ia1 − Ic2 | | Ia1 |
| 5th Sample Duration | −Ic2 | Ic2 | |
| 6th Sample Duration | Ia2 | Ia2 | |
| 7th Sample Duration | 0 | | |

As shown in Table 7, at least one phase current (e.g., Ia1) is detected indirectly based on directly measured phase currents. Furthermore, the controller is able to determine the value of Ib1 because Ib1 is equal to the sum of −Ia1 and −Ic1. Likewise, the controller is able to determine the value of Ib2 because Ib2 is equal to the sum of −Ia2 and −Ic2.

It should be noted that in the third current sample duration, Ic2 is detected indirectly. In the fifth current sample duration, Ic2 is detected directly. The controller may determine Ic2 based on the average of these two measured results.

Figure 13:
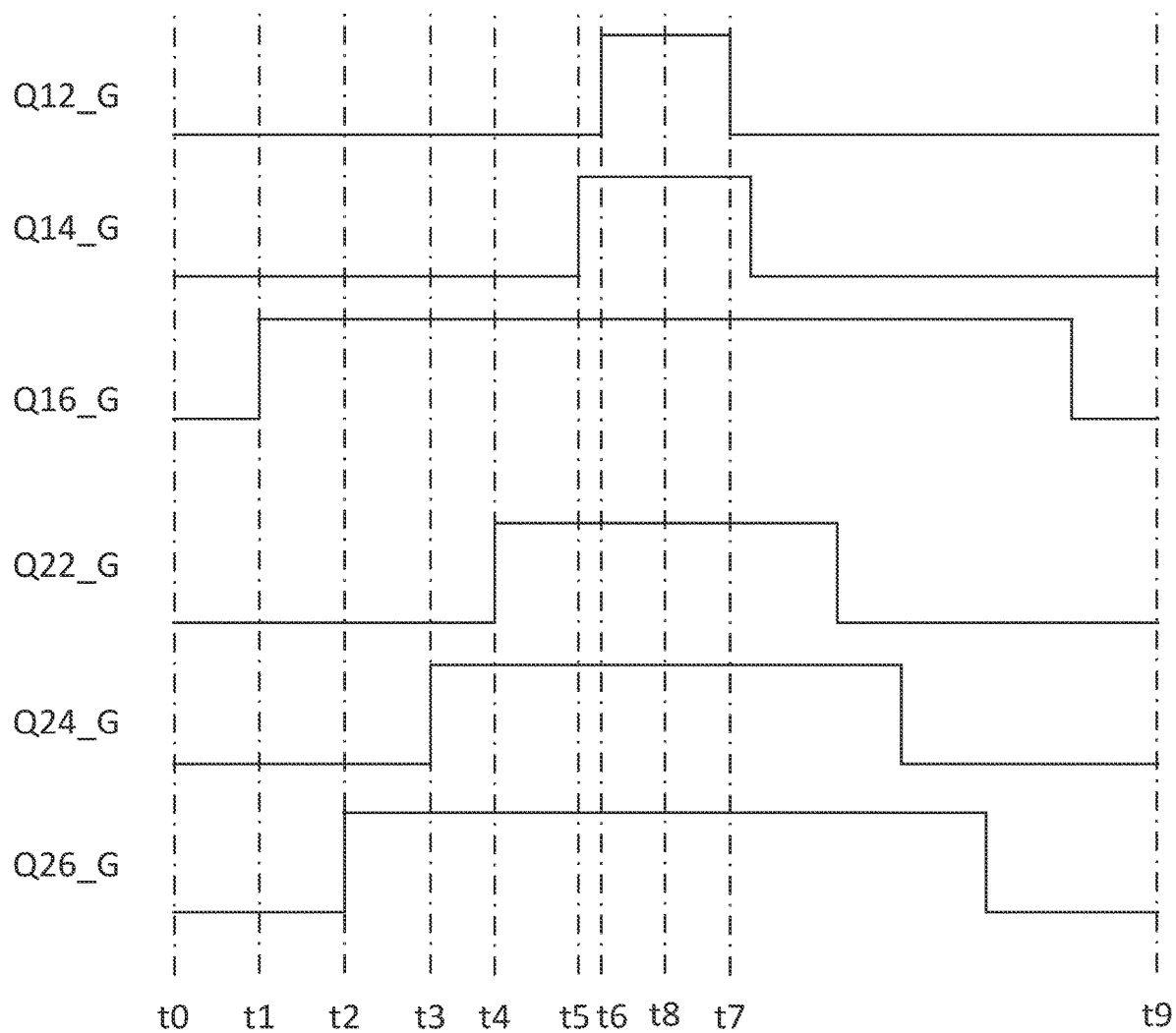
FIG. 13 illustrates an eighth PWM pattern of the dual-motor system under the second current sense configuration in accordance with various embodiments of the present disclosure.

FIG. 13 illustrates an eighth PWM pattern of the dual-motor system under the second current sense configuration in accordance with various embodiments of the present disclosure. The eighth PWM pattern shown in FIG. 13 is similar to the fifth PWM pattern shown in FIG. 10 except that the gate drive signal of Q14 and the gate drive signal of Q22 are swapped. The current detection method applied to the eighth PWM pattern is similar to that applied to the first PWM pattern described above with respect to FIG. 6, and hence is not discussed herein again to avoid repetition.

Table 8 shows the direct and indirect current measurement results obtained through applying the current detection method described above to the eighth PWM pattern shown in FIG. 13.

TABLE 8

| Current Sample Duration | Motor Currents | Motor Current Detected Directly | Motor Current Detected Indirectly |
|---|---|---|---|
| 1st Sample Duration | 0 | | |
| 2nd Sample Duration | −Ic1 | Ic1 | |
| 3rd Sample Duration | −Ic1 − Ic2 | | Ic2 |
| 4th Sample Duration | Ia2 − Ic1 | | Ia2 |
| 5th Sample Duration | −Ic1 | Ic1 | |
| 6th Sample Duration | Ia1 | Ia1 | |
| 7th Sample Duration | 0 | | |

As shown in Table 8, at least one phase current (e.g., Ic2) is detected indirectly based on directly measured phase currents. Furthermore, the controller is able to determine the value of Ib1 because Ib1 is equal to the sum of −Ia1 and −Ic1. Likewise, the controller is able to determine the value of Ib2 because Ib2 is equal to the sum of −Ia2 and −Ic2.

It should be noted that in the second current sample duration, Ic1 is detected directly. In the fifth current sample duration, Ic1 is detected directly. The controller may determine Ic1 based on the average of these two measured results.

Figure 14:
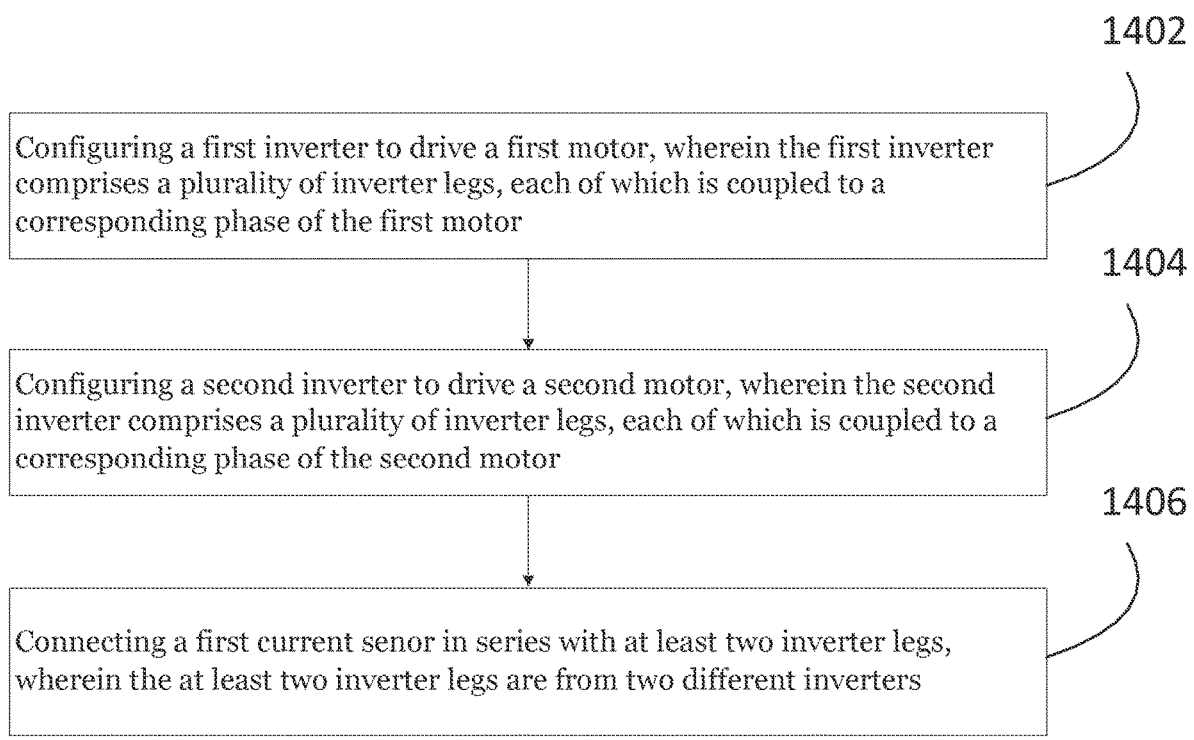
FIG. 14 illustrates a flow chart of a method for detecting currents in a dual-motor system in accordance with various embodiments of the present disclosure.

FIG. 14 illustrates a flow chart of a method for detecting currents in a dual-motor system in accordance with various embodiments of the present disclosure. This flowchart shown in FIG. 14 is merely an example, which should not unduly limit the scope of the claims. One of ordinary skill in the art would recognize many variations, alternatives, and modifications. For example, various steps illustrated in FIG. 14 may be added, removed, replaced, rearranged and repeated.

Referring back to FIG. 1 and FIG. 4, a dual-motor system comprises a first inverter (e.g., inverter 101) having a plurality of inverter legs, each of which comprises two switches connected in series, a first motor (e.g., motor 111) having a plurality of phases, each of which is configured to be driven by a corresponding leg of the first inverter, a second inverter (e.g., inverter 102) having a plurality of inverter legs, each of which comprises two switches connected in series, and a second motor (e.g., motor 112) having a plurality of phases, each of which is configured to be driven by a corresponding leg of the second inverter.

Referring back to FIG. 1, a current sense apparatus comprises three current sensors (e.g., current sensors S1, S2 and S3). The current sense apparatus is configured to sense currents flowing in the first inverter and the second inverter. Each current sensor of the current sense apparatus is shared by two inverter legs. These two inverter legs are from two different inverters.

Referring back to FIG. 4, a current sense apparatus comprises a single current sensor (e.g., current sensor S1). The current sense apparatus is configured to sense currents flowing in the first inverter and the second inverter. The single current sensor of the current sense apparatus is shared by the inverter legs of the first motor and the second motor.

One advantageous feature of having the current sense apparatus is the cost of bill of materials (BOM) may be halved in comparison a convention implementation of the current sense apparatus in the motor drive applications. Furthermore, the space occupied by the current sense apparatus is reduced, thereby simplifying the printed circuit board (PCB) design. The current sense apparatus can also reduce the number of pins of the controller (e.g., a MCU). As a result, a smaller MCU package may be used in response to the pin number reduction. In addition, the current sense apparatus also reduces the total power losses in the current sense apparatus.

In operation, the following steps are employed to detect the currents flowing in the first motor and the second motor.

At step 1402, a first inverter is configured to drive a first motor. The first inverter comprises a plurality of inverter legs, each of which is coupled to a corresponding phase of the first motor.

At step 1404, a second inverter is configured to drive a second motor. The second inverter comprises a plurality of inverter legs, each of which is coupled to a corresponding phase of the second motor.

At step 1406, a first current sensor is connected in series with at least two inverter legs. The at least two inverter legs are from two different inverters.

The method further comprises configuring the first current sensor to detect currents flowing through a first inverter leg of the first inverter and a first inverter leg of the second inverter; configuring a second current sensor to detect currents flowing through a second inverter leg of the first inverter and a second inverter leg of the second inverter; and configuring a third current sensor to detect currents flowing through a third inverter leg of the first inverter and a third inverter leg of the second inverter.

The method further comprises configuring gate drive signals of the first inverter and gate drive signals of the second inverter such that a 180-degree phase shift is between the gate drive signals of the first inverter and the gate drive signals of the second inverter.

The method further comprises configuring the first current sensor to detect currents flowing through a first inverter leg, a second inverter leg and a third inverter leg of the first inverter, and a first inverter leg, a second inverter leg and a third inverter leg of the second inverter.

The method further comprises configuring gate drive signals of the first inverter and gate drive signals of the second inverter such that the gate drive signals of the first inverter are in phase with the gate drive signals of the second inverter.

The method further comprises sampling phase currents of the first motor and the second motor in a sequential manner, wherein at least one phase current is detected indirectly based on directly measured phase currents.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
    a first inverter configured to drive a first motor having a plurality of phases, the first inverter comprising a plurality of inverter legs, each of which is coupled to a corresponding phase of the first motor;
    a second inverter configured to drive a second motor having a plurality of phases, the second inverter comprising a plurality of inverter legs, each of which is coupled to a corresponding phase of the second motor; and
    a first current sensor configured to sense currents flowing in the first inverter and the second inverter, wherein the first current sensor is shared by at least by two inverter legs.

2. The apparatus of claim 1, further comprising a second current sensor, wherein:
    a first inverter leg of the first inverter and a first inverter leg of the second inverter are connected in parallel and further connected in series with the first current sensor; and
    a second inverter leg of the first inverter and a second inverter leg of the second inverter are connected in parallel and further connected in series with the second current sensor.

3. The apparatus of claim 2, wherein:
    the first inverter leg of the first inverter comprises two switches connected in series, and wherein a common node of the two switches of the first inverter leg of the first inverter is connected to a first phase of the first motor;
    the second inverter leg of the first inverter comprises two switches connected in series, and wherein a common node of the two switches of the second inverter leg of the first inverter is connected to a second phase of the first motor;
    a third inverter leg of the first inverter comprises two switches connected in series, and wherein a common node of the two switches of the third inverter leg of the first inverter is connected to a third phase of the first motor;
    the first inverter leg of the second inverter comprises two switches connected in series, and wherein a common node of the two switches of the first inverter leg of the second inverter is connected to a first phase of the second motor;
    the second inverter leg of the second inverter comprises two switches connected in series, and wherein a common node of the two switches of the second inverter leg of the second inverter is connected to a second phase of the second motor; and
    a third inverter leg of the second inverter comprises two switches connected in series, and wherein a common node of the two switches of the third inverter leg of the second inverter is connected to a third phase of the second motor.

4. The apparatus of claim 2, further comprising a third current sensor, wherein:
    a third inverter leg of the first inverter and a third inverter leg of the second inverter are connected in parallel and further connected in series with the third current sensor.

5. The apparatus of claim 1, wherein:
    the first current sensor is configured to sense a current flowing through a first inverter leg of the first inverter at a first time instant, and sense a current flowing through a first inverter leg of the second inverter at a second time instant, and wherein the first time instant and the second time instant are of a 180-degree phase shift.

6. The apparatus of claim 1, wherein:
a first inverter leg of the first inverter, a second inverter leg of the first inverter, a third inverter leg of the first inverter, a first inverter leg of the second inverter, a second inverter leg of the second inverter and a third inverter leg of the second inverter are connected in parallel and further connected in series with the first current sensor.

7. The apparatus of claim 6, wherein:
a center of drive signals of the first inverter is aligned with a center of drive signals of the second inverter.

8. The apparatus of claim 6, wherein:
at least one phase current is detected indirectly based on directly measured phase currents.

9. A method comprising:
configuring a first inverter to drive a first motor, wherein the first inverter comprises a plurality of inverter legs, each of which is coupled to a corresponding phase of the first motor;
configuring a second inverter to drive a second motor, wherein the second inverter comprises a plurality of inverter legs, each of which is coupled to a corresponding phase of the second motor; and
connecting a first current sensor in series with at least two inverter legs, wherein the at least two inverter legs are from two different inverters.

10. The method of claim 9, further comprising:
configuring the first current sensor to detect currents flowing through a first inverter leg of the first inverter and a first inverter leg of the second inverter;
configuring a second current sensor to detect currents flowing through a second inverter leg of the first inverter and a second inverter leg of the second inverter; and
configuring a third current sensor to detect currents flowing through a third inverter leg of the first inverter and a third inverter leg of the second inverter.

11. The method of claim 10, wherein:
the first inverter leg of the first inverter and the first inverter leg of the second inverter are connected in parallel and further connected in series with the first current sensor;
the second inverter leg of the first inverter and the second inverter leg of the second inverter are connected in parallel and further connected in series with the second current sensor; and
the third inverter leg of the first inverter and the third inverter leg of the second inverter are connected in parallel and further connected in series with the third current sensor.

12. The method of claim 10, further comprising:
configuring gate drive signals of the first inverter and gate drive signals of the second inverter such that a 180-degree phase shift is between the gate drive signals of the first inverter and the gate drive signals of the second inverter.

13. The method of claim 9, further comprising:
configuring the first current sensor to detect currents flowing through a first inverter leg, a second inverter leg and a third inverter leg of the first inverter, and a first inverter leg, a second inverter leg and a third inverter leg of the second inverter.

14. The method of claim 13, wherein:
a first inverter leg of the first inverter, a second inverter leg of the first inverter, a third inverter leg of the first inverter, a first inverter leg of the second inverter, a second inverter leg of the second inverter and a third inverter leg of the second inverter are connected in parallel and further connected in series with the first current sensor.

15. The method of claim 13, further comprising:
configuring gate drive signals of the first inverter and gate drive signals of the second inverter such that the gate drive signals of the first inverter are in phase with the gate drive signals of the second inverter.

16. The method of claim 13, further comprising:
sampling phase currents of the first motor and the second motor in a sequential manner, wherein at least one phase current is detected indirectly based on directly measured phase currents.

17. A system comprising:
a first inverter having a plurality of inverter legs, each of which comprises two switches connected in series;
a first motor having a plurality of phases, each of which is configured to be driven by a corresponding inverter leg of the first inverter;
a second inverter having a plurality of inverter legs, each of which comprises two switches connected in series;
a second motor having a plurality of phases, each of which is configured to be driven by a corresponding inverter leg of the second inverter; and
a current sense apparatus configured to sense currents flowing in the first inverter and the second inverter, wherein the current sense apparatus is shared by at least by two inverter legs.

18. The system of claim 17, wherein the current sense apparatus comprises a first current sensor, a second current sensor and a third current sensor, and wherein:
a first inverter leg of the plurality of inverter legs of the first inverter and a first inverter leg of the plurality of inverter legs of the second inverter are connected in parallel and further connected in series with the first current sensor;
a second inverter leg of the plurality of inverter legs of the first inverter and a second inverter leg of the plurality of inverter legs of the second inverter are connected in parallel and further connected in series with the second current sensor;
a third inverter leg of the plurality of inverter legs of the first inverter and a third inverter leg of the plurality of inverter legs of the second inverter are connected in parallel and further connected in series with the third current sensor; and
drive signals of the first inverter and drive signals of the second inverter are of a 180-degree phase shift.

19. The system of claim 17, wherein the current sense apparatus comprises a current sensor, and wherein:
the plurality of inverter legs of the first inverter and the plurality of inverter legs of the second inverter are connected in parallel and further connected in series with the current sensor; and
drive signals of the first inverter are in phase with drive signals of the second inverter.

20. The system of claim 19, wherein:
the current sensor is a resistor.